United States Patent

Edington et al.

[15] 3,660,202

[45] May 2, 1972

[54] BONDING OF SHAPED ARTICLES OF POLYESTER

[72] Inventors: Robert Alexander Edington; Derek Harry Aldred, both of Harrogate, England

[73] Assignee: Imperial Chemical Industries, Limited, London, England

[22] Filed: Apr. 25, 1969

[21] Appl. No.: 819,423

Related U.S. Application Data

[63] Continuation-in-part of Ser. No. 585,243, Oct. 10, 1966, abandoned.

[30] Foreign Application Priority Data

Oct. 18, 1965 Great Britain.....................43,983/65

[52] U.S. Cl.............................156/335, 156/315, 260/29.3, 260/838, 260/845, 260/619 A
[51] Int. Cl. ........................................................C09j 3/12
[58] Field of Search..............156/335, 315; 260/29.3, 619 A, 260/838, 845

[56] References Cited

UNITED STATES PATENTS

| | | | |
|---|---|---|---|
| 2,211,951 | 8/1940 | Hershberger | 156/335 X |
| 2,653,886 | 9/1953 | Gentle et al. | 156/335 X |
| 3,367,827 | 2/1968 | Gallagher | 161/227 |
| 3,410,749 | 11/1968 | Chmiel | 161/92 |
| 3,410,818 | 11/1968 | Yurcick et al. | 260/29.3 |

*Primary Examiner*—Carl D. Quarforth
*Assistant Examiner*—E. A. Miller
*Attorney*—Cushman, Darby & Cushman

[57] ABSTRACT

An improved process is described for bonding polyester shaped articles to rubber. The improvement comprises treating the polyester surface with an aqueous solution of a bis(dihydroxyphenyl methyl)phenol which results in an increased bond strength using conventional aqueous rubber latex and resorcinol formaldehyde condensate dips to bond the polyester to the rubber. The surface treatment may be effected in a separate prior process followed by a conventional bonding process using a rubber latex and a resorcinol formaldehyde condensate, or it may be effected in a single bath process together with a rubber latex and a resorcinol formaldehyde condensate.

7 Claims, No Drawings

BONDING OF SHAPED ARTICLES OF POLYESTER

This is a continuation-in-part of our prior application Ser. No. 585,243, filed Oct. 10, 1966, now abandoned.

The present invention relates to the bonding to rubber of synthetic linear polyester shaped articles such as filaments, fibers and films.

Many adhesives and bonding systems for synthetic linear polyester shaped articles are known. They suffer from various disadvantages, including toxicity, for example in the case of adhesives based on certain glycidyl ethers; complexity, such as a system based on a mixture of ten compounds including polyvinyl chloride, dioctyl phthalate, acetic acid, isopropyl alcohol, surfactants, ammonia and a proprietary polyamide; instability, as in the case of adhesives based on polyisocyanates, which hydrolyse readily in contact with moisture; insolubility in water, as in the case of adhesives based on certain blocked isocyanates; and even inadequate adhesion, for example under the extreme conditions of use found in motor vehicle tires.

The difficulty in achieving good adhesion to surfaces composed essentially of polyester, in contrast to surfaces composed of, for instance, polyamide or cellulosic materials, is well known. In general terms it is clear that the explanation lies in the relatively high frequency of active or polar groups (—NH, —OH) along the macromolecular chains in polyamides and cellulose in contrast to polyesters in which similarly active or polar groups (—OH, —COOH) are found only at the ends of the macromolecules. Consequently, when phenol aldehyde condensate adhesives which are effective for polyamide and cellulosic materials are applied to polyester surfaces the results are poor. Alternative adhesive compositions for polyester surfaces have at various times been proposed but all suffer from some or all of the disadvantages including instability, complexity of manufacture, cost, toxicity, or inadequate adhesion.

According to the present invention there is provided an improved method of bonding shaped articles of synthetic linear polyester to rubber using a resorcinol formaldehyde condensate and a rubber latex characterized in that there is applied to the surface of such shaped articles and fused in contact therewith, a fusible substance comprising molecular groups X, Y and Z connected by methylene groups and having end groups HX and ZH, said substance being predominantly $HXCH_2YCH_2H$ and having an average molecular weight of at least 300, melting in the range 10° C. to 300° C., and having a solubility of at least 1 percent in N aqueous ammonia at 25° C., wherein X and Z, which may be the same or different, are radicals derived by removing two hydrogen atoms from the benzene nucleus of resorcinol or substituted resorcinols wherein substituted groups may be selected from chloro, bromo, carboxyl, hydroxyl and alkyl containing no more than five carbon atoms, and Y is a radical derived by removing two hydrogen atoms from the benzene nucleus of a halo or alkyl monohydroxybenzene wherein no alkyl group contains more than five carbon atoms.

In the process of this invention known vulcanizable adhesive aids of conventional type comprise mixtures of a vulcanizable rubber latex and a solution of a resorcinol formaldehyde condensate; a large number of different such formulations having been described and used. The polyester articles can be bonded to natural or synthetic rubbers or to mixtures of these, and the aqueous latex of vulcanizable rubber may be a latex of a natural rubber or a latex of synthetic vulcanizable rubber or a mixture of these. Good results are obtained when a synthetic butadiene, styrene, vinyl pyridene (in the ration 70:15:15 by weight) terpolyester latex is used.

In the fusible substances used in the process of this invention particularly suitable resorcinols are resorcinol, α- and β-resorcylic acid, 4-chlororesorcinol, 4-bromoresorcinol, 2- and 4-methyl resorcinol and phloroglucinol. Particularly suitable substituted monohydroxy benzenes are ortho chlorophenol, para chlorophenol, ortho bromophenol, para bromophenol, o-cresol, p-cresol, 3,4-dichlorophenol, p-tertiary butyl phenol, and 2,5-dimethyl phenol.

The fusible substances may be prepared by reacting the substituted monohydroxybenzene with formaldehyde or a substance capable of yielding formaldehyde to give a bishydroxymethyl derivative of the substituted phenol. This is then reacted with resorcinol, a substituted resorcinol or a mixture of these to give the required fusible substance. Other conventional methods of preparation of the compounds can be used, but a direct reaction between the substituted monohydroxybenzenes, formaldehyde and the resorcinol or substituted resorcinol is not suitable because it gives rise predominantly to resins derived from the resorcinol or substituted resorcinol and formaldehyde. It is an important feature of our invention that the group Y hereinbefore defined be an integral part of the molecule.

Variation of the proportions of the reactants can give rise to various products, as, for example, X-Y-X-Y-Z, and in most cases a number of isomer forms are also possible. The compositions themselves may therefore not be precisely defined in chemical terms but they are characterized in that they have melting points between 10° C. and 300° C. and preferably between 160° C. and 280° C., and have a solubility of at least 1 percent in N aqueous ammonia at 25° C. Particularly useful are substances prepared by reacting at least one resorcinol or substituted resorcinol with a monohydroxybenzene as hereinbefore defined, the molar ratio resorcinol/monohydroxybenzene used being in the range of 0.33 to 10, preferably 1.2 to 3. In the case where X and Z are not the same, and more than one resorcinol is used in the preparation, the molar ratio is calculated using as numerator the sum of the molar amounts of the resorcinols.

It should be appreciated that the products which are obtained by the condensation reaction hereinbefore described will have properties such as molecular weight, melting point, and solubility which depend on the ratio of the reactants and upon the reaction conditions. In particular, if the products are made by a two stage reaction, the degree to which the intermediate substituted bis-hydroxymethyl monohydroxybenzene is purified has a profound effect on the properties of the final product, a highly purified sample giving rise to a product of high melting point.

Products which are of too high melting point for use with a particular polyester can be used when mixed with lower melting products so that the mixed composition melts within the desired range.

In general it is preferred that such fusible substances for use in the bonding process of our invention should be substantially linear, and of the form XYZ. Branched or cross-linked polymers and oligomers tend to be fusible and insoluble. For this reason also, it is preferred that the substituted monohydroxybenzene constituting the Y group as defined, should have only two reactive positions available for reaction with formaldehyde, thus giving predominantly linear oligomers. Small amounts of trifunctional materials which give rise to branched or cross-linked oligomers may also be tolerated provided that they are derived from the defined substituted monohydroxybenzenes.

The compositions of our invention are used to bond shaped articles of synthetic linear polyesters to rubber, the polyesters being homopolymers or copolymers.

Polyesters articles and rubber may be bonded according to our invention in one or two stages. If the treatment is carried out in a single stage the polyester article can be treated with a mixture of the fusible substance in combination with a vulcanizable rubber latex and a resorcinol-formaldehyde condensate, and then heated to a temperature above the melting point of the polyester. If the treatment is carried out in two stages, the first stage consists of the application of the fusible substance, followed by heating to a temperature above the melting point of the fusible substance but below the melting point of the polyester, and the second stage of an application of a mixture of the resorcinol-formaldehyde condensate and the vulcanizable rubber latex, followed by a further heat treatment to bond the rubber latex to the surface of the polyester.

In the two stage process, the two stages can be carried out in quick succession, or the polyester article treated by the first stage can be kept for a considerable time without deterioration before the second stage is carried out.

The adhesive compositions may be applied to the surface of the polyester shaped article by any conventional method, such as dipping, spraying or spreading, or in the case of a two-stage application, the fusible substance may be applied as a first stage in powder form. The temperature at which the adhesive formulation is applied is not critical but should not be so low that congealing or other separation of the components occurs and not so high that appreciable volatilization takes place. Temperatures between 10° and 40° C. have been found to be very suitable. The treated polyester article is then dried and heated to a temperature above the melting point of the fusible substance before being embedded in rubber and the composite structure vulcanized. The conditions, such as temperature and duration of this heat treatment will vary according to circumstances, but it is preferred that the polyester should be heated for between 1 second and 5 minutes at a temperature which is above the melting temperature of the fusible substance but which is below the melting point of the polyester.

The fusible substance may be applied to the polyester shaped article at any convenient stage during its processing. For example, they may be applied to yarns which are subsequently twisted together to form cords, or they can be applied to the pre-formed cords. The compositions having been applied to the surface of the polyester, and bonded thereto by heating, are stable and do not interfere with subsequent processing of the polyester.

The fusible substance can be used in solutions of strength in the range ½–40 percent weight/volume, but concentrations of 3 to 20 percent are preferred. The solutions may contain other additives, for example, wetting agents, thickeners, finishes and the like. The concentration of the fusible substance, the travelling speed of the polyester shaped article, the tension under which the polyester article is held, and other factors can be adjusted such that the pick-up of the fusible substance is in the range ¼–40 percent by weight of the polyester shaped article after drying. It is preferred however that the pick-up be in the range 1–20 percent by weight. The drying and heating treatments which are applied to the polyester shaped article after application of the solution or emulsion can be combined with stretching, setting or shrinking operations. The polyester shaped articles which are coated with adhesive compositions as hereinbefore described can be used for the manufacture of articles such as tires, tubes, belts, and hoses, and in any other applications where the bonding of polyesters to rubber is desired.

In order that the invention can be more fully understood, it will now be described in further detail with reference to the following examples:

EXAMPLE 1

A poly(ethylene terephthalate) yarn, having 252 filaments and a total denier of 1,000, was, after the last stage of the drawing process subjected to a first stage treatment comprising being passed under a tension of 400 g. through a 20 percent solution of a composition comprising 2:6-bis-(2'-4'-dihydroxyphenylmethyl)-4-chlorophenol in 5N aqueous ammonia, passed for a period of 55 seconds under a tension of 600 g. through an air oven at 220° C., and wound up. The so treated yarn was converted into a two-ply cord, 10 twists per inch being used in both single and plying twists. The cord was then passed through a mixture of an aqueous solution of a resorcinol-formaldehyde condensate and a butadiene-styrene-vinyl pyridine terpolymer latex in which the proportion of the three monomers in the terpolymer was approximately 70:15:15 by weight. The cord was under a tension of 400 g. and after dipping was heat treated at 150° C. for 55 seconds under a tension of 600 g.

The adhesion of the cord to a rubber tire stock was measured by moulding into rubber in a mould in which U-shaped loops of cord were embedded for one-half inch of their length in each legs of the U. The rubber had the composition:

| | |
|---|---|
| Smoked Sheet | 100 parts |
| Stearic Acid | 2 parts |
| Zinc Oxide | 5 parts |
| FEF Carbon Black | 40 parts |
| Pine Tar | 1.5 parts |
| Coumarone Resin | 1.5 parts |
| Antioxidant "Nonox" BL (RTM) | 2.0 parts |
| Dibenzthiazyl Disulphide | 0.85 parts |
| Insoluble Sulphur | 2.6 parts |

After curing these moulds were placed in a heater attachment for a tensile testing machine and the force required to pull the loops out of the rubber at 120° C. was measured. The mean pull-out force was found to be 28 lb.

The composition comprising 2,6-bis-(2',4'-dihydroxy phenylmethyl)- 4-chlorophenol was prepared by the following method:

METHOD 1

768 g. of p- chlorophenol (6.0 moles) was dissolved in 300 g. (7.5 moles) of sodium hydroxide and 1,200 ml. of water. To this solution was added 37 percent aqueous formaldehyde 1,320 ml. (16.6 moles). This solution was maintained in a thermostat bath at 37° C. for 40 hours. The precipitated sodium salt was filtered off, slurried with cold water and refiltered. The sodium salt was then dissolved in water at 90° C., acidified to pH 6.0 with glacial acetic acid, cooled to room temperature and the dimethylol derivative filtered off, and slurried with cold water until acid free.

This product was crystallised from ethyl alcohol and consisted of 2,6-bishydroxymethyl- 4-chlorophenol. It had a melting point of 161°–163° C.

The dimethylol derivative 2,6-bishydroxymethyl- 4-chlorophenol 70 g. (0.375 mole) and resorcinol 124 g. (1.125 moles) were ground together and fused by heating at 150° C. under nitrogen in a polycondensation apparatus for 2 hours. The product was then boiled with water to remove excess resorcinol, filtered hot and dried. The product was a reddish-brown solid comprising 2,6 bis (2', 4'-dihydroxyphenyl methyl) 4-chlorophenol. It was a fusible oligomer with a melting temperature of 150°–200° C. and its solubility in 5 normal aqueous ammonia was greater than 20 percent weight/volume.

EXAMPLE 2

A poly(ethylene terephthalate) filament yarn cord, consisting of two plies of 1,000 denier and having 11 turns per inch twist in both the single twisting and in the plying operation, was treated under the conditions used in Example 1 with a mixture made up in the following manner:

Solution A was made by dissolving 20 parts of a composition comprising 2,6-bis-(2',4'-dihydroxy phenylmethyl)- 4-methylphenol in 80 parts of 5N aqueous ammonia.

Solution B was made by dissolving resorcinol (50 parts) in a mixture of 37 percent aqueous formaldehyde solution (28 parts) and water (337 parts).

Dispersion C was made by adding to solution B (145 parts) an aqueous synthetic rubber latex containing a styrene-butadiene-vinyl pyridine copolymer (585 parts).

The final Treating Mixture was made by adding together equal weights of solution A and Dispersion C.

Adhesion of the cord to rubber was measured as in Example 1, and the mean pull-out force was found to be 26 lb.

For comparison purposes, a poly(ethylene terephthalate) cord as described in Example 2 was passed through an aqueous dispersion of a resorcinol-formaldehyde condensate and a butadiene-styrene-vinyl pyridine terpolymer latex (dispersion C of Example 2). After being processed as in Example 1, the adhesion of the cord to rubber was measured as in Example 1, and the mean pull-out force was found to be 17 lb.

EXAMPLE 3

A filament yarn consisting of poly(ethylene 1,2 diphenoxyethane 4,4'-dicarboxylate) fibers which contained two plies each containing 400 filaments and each of 1,130 denier and having 11 turns per inch in both the single twisting and plying operations was treated in the manner described in Example 2. When the cords were embedded in rubber and tested as in Example 1, the mean pull-out force was found to be 30 lb.

EXAMPLE 4

A poly(ethylene terephthalate) cord as described in Example 2 was dipped in a mixture of vulcanizable rubber latex and a resorcinol-formaldehyde condensate as in Example 2 containing a composition made as described hereinafter from 2,6-bishydroxymethyl- 4-chlorophenol and resorcinol, the condensate having melting point 215°–230° C. The adhesion to rubber, determined as in Example 1, was 24.8 lb.

Under similar conditions another composition, which was prepared from the same starting materials under slightly different conditions, having a melting point of 160°–170° C., gave an adhesion value of 35.3 lb. When the two compositions were mixed in the proportion 3 parts by weight of the first to one part by weight of the second, the resultant product had a melting point of 190°–210° c. and the adhesion value found on repeating this treatment was 33.6 lb. This is higher than the value which would be expected from an arithmetic mean of the two results (27.6 lb.).

The composition used in this example was made by an aqueous reaction route as follows:

METHOD 2

2,6-bishydroxymethyl- 4-chlorophenol (564 parts), resorcinol (660 parts) and water (2,200 parts) were refluxed together with stirring for 3 hours. A further 2,000 parts of water were added and the mixture was allowed to cool. It was filtered and the product was dried. The product melted at 180°–200° C. and was soluble in 3 normal aqueous ammonia to the extent of at least 20 percent weight/volume.

EXAMPLE 5

Three condensates of 2,6-bis-hydroxymethyl-4-chlorophenol were prepared by the method described in Method 2. The molar ratios of the reactants were varied. The condensates were applied to poly(ethylene terephthalate) cord and tested for adhesion to rubber as in Example 2, with the following results.

| Molar ratio | M.p of Condensate ° C. | Adhesion value lbs. |
|---|---|---|
| 1.6:1 | 220–235 | 32.7 |
| 1.4:1 | 240–250 | 27.3 |
| 1.2:1 | 240–250 | 25.0 |

The Molar ratio of column 1 is the ratio of resorcinol to 2,6-bishydroxymethyl- 4-chlorophenol used in the reaction.

EXAMPLE 6

A condensate of resorcinol with 2,6-bishydroxylmethyl- 4-bromophenol was prepared according to Method 1, the ratio of resorcinol to 2,6-bishydroxymethyl- 4-bromophenol being 2:1. This was applied to a poly(ethylene terephthalate) cord as in Example 2. Adhesion values were measured as in Example 2, and the mean adhesion value was 31.0 lb.

EXAMPLE 7

A condensate was prepared from resorcinol and 2-chloro-4,6-bishydroxymethyl phenol in the molar ratio 2:1 according to Method 2. When this was applied to poly(ethylene terephthalate) cord and tested as in Example 2, a mean pull-out force of 25 lb. was obtained.

EXAMPLE 8

A condensate was prepared from resorcinol and 2,6-bis-hydroxymethyl-4-methyl phenol in the molar ration 2:1 according to Method 2. This was applied to poly(ethylene terephthalate) cord and tested as in Example 2. The mean pull-out force was 28 lb.

EXAMPLE 9

A condensate was prepared from resorcinal and 2,6-bishydroxy- methyl- 4-tert.butyl phenol in the molar ratio 2:1 according to Method 2. This was applied to poly(ethylene terephthalate) cord and tested in Example 2. The mean pull-out force was 23 lb.

EXAMPLE 10

A condensate was prepared from resorcinol and 2,5-dimethyl-4,6-bishydroxymethyl phenol according to Method 1. This was applied to poly(ethylene terephthalate) cord and tested as in Example 2. The mean pull-out force was 23 lb.

EXAMPLE 11

A condensate was prepared according to Method 2, between 4-chlororesorcinol and 2,6-bishydroxymethl- 4-chlorophenol in the molar ratio 2:1. This was applied to poly(ethylene terephthalate) cord and tested as in Example 2 and a mean pull-out force of 24 lb. was obtained.

EXAMPLE 12

A condensate was prepared according to Method 2 between phloroglucinol and 2,6-bishydroxymethyl- 4-methyl phenol in the molar ratio 2:1. This was applied to poly(ethylene terephthalate) cord and tested as in Example 2 and a mean pull-out force of 22 lb. was obtained.

For further purposes of comparison, a condensate was prepared according to Method 2 between resorcinol and 2,6-bishydroxymethyl- 4-octyl phenol in the molar ratio 2:1. When applied to the surface of poly(ethylene terephthalate) cord as described in Example 1 and tested as described in Example 1 it gave an adhesion value of only 15 pounds.

This comparative example illustrates that compositions in which -Y- comprises a monohydroxybenzene containing eight (i.e. more than five) carbon atoms in the side chain do not give the improvement of our invention.

EXAMPLE 13

The condensate of Example 5 where the molar ratio was 1.6:1 was applied to poly(ethylene terephthalate) cord as in Example 2 except that the final treating mixture was prepared by mixing one part by weight of solution A with two parts by weight of Dispersion C. When the cords were embedded in rubber and tested as in Example 1, the mean pull-out force was found to be 31 lb.

What we claim is:

1. In a process for bonding a shaped article of synthetic linear polyester to rubber comprising applying to the surface of the article a resorcinol formaldehyde resin and a rubber latex and heating to bond the rubber latex to the article, the improvement comprising applying to the surface of such polyester article an aqueous solution of a fusible substance comprising molecular groups X, Y AND Z connected by methylene groups and having end groups HX and ZH; wherein X and Z are radicals derived by removing two hydrogen atoms from the benzene nucleus of substituted resorcinols having substituent groups selected from the group consisting of hydrogen, hydroxyl, carboxyl, chloro, bromo and alkyl containing no more than five carbon atoms and Y is a radical derived by removing two hydrogen atoms from the benzene nucleus of substituted monohydroxy benzene having a substituent group selected from the group consisting of chloro, bromo and alkyl containing no more than five carbon atoms; such fusible substance in having a molecular weight of at least 300, melting in the range 160° C. to 280° C. and having a solubility of at least 1 percent in N aqueous ammonia at 25° C., so that the fusible substance is predominantly trinuclear of the form $HXCH_2YCH_2ZH$.

2. A process according to claim 1 in which said fusible substance is fused in intimate contact with the surface of the polyester article, and subsequently a resorcinol formaldehyde resin and a rubber latex are applied to the so treated surface and heated thereon.

3. A process according to claim 2 in which said substituted resorcinols are resorcinol.

4. A process according to claim 3 in which said substituted monohydroxy benzene is 4-chloro phenol.

5. A process according to claim 1 in which the fusible substance, the resorcinol formaldehyde resin and the rubber latex are applied together to the polyester surface and heated thereon.

6. A process according to claim 5 in which said substituted resorcinols are resorcinol.

7. A process according to claim 6 in which said substituted monohydroxy benzene is 4-chloro phenol.

* * * * *